United States Patent [19]

Kawase

[11] Patent Number: 4,471,858
[45] Date of Patent: Sep. 18, 1984

[54] DISC BRAKE
[75] Inventor: Kazuo Kawase, Saitama, Japan
[73] Assignee: Akebono Brake Industries Co., Ltd., Tokyo, Japan
[21] Appl. No.: 377,095
[22] Filed: May 11, 1982

Related U.S. Application Data

[63] Continuation of Ser. No. 145,923, May 2, 1980, abandoned.

[30] Foreign Application Priority Data

| Jul. 10, 1979 | [JP] | Japan | 54-94184 |
| Jul. 10, 1979 | [JP] | Japan | 54-94183 |
| Oct. 26, 1979 | [JP] | Japan | 54-137787 |
| Dec. 28, 1979 | [JP] | Japan | 54-183788 |

[51] Int. Cl.³ .................................... F16D 65/40
[52] U.S. Cl. .................... 188/73.38; 188/73.36; 188/73.44
[58] Field of Search .............. 188/73.36, 73.38, 73.32, 188/73.34, 73.35, 73.39, 73.44, 73.45, 73.43; 192/300

[56] References Cited

U.S. PATENT DOCUMENTS

| 3,612,227 | 10/1971 | Schaftner | 188/73.39 X |
| 3,782,510 | 1/1974 | Rath | 188/73.35 X |
| 3,848,709 | 11/1974 | Tourneur | 188/73.39 X |
| 3,915,263 | 10/1975 | Courbot | 188/73.43 X |
| 3,924,711 | 12/1975 | Hoffmann et al. | 188/73.34 |
| 3,976,169 | 8/1976 | Ogawa | 188/73.44 X |
| 3,977,498 | 8/1976 | Ogawa | 188/73.45 |
| 4,180,148 | 12/1979 | Souma | 188/73.38 |

FOREIGN PATENT DOCUMENTS

| 2301595 | 7/1974 | Fed. Rep. of Germany | 188/73.32 |
| 2334232 | 1/1975 | Fed. Rep. of Germany | 188/73.38 |
| 2603549 | 8/1976 | Fed. Rep. of Germany | 188/73.36 |
| 2828934 | 1/1979 | Fed. Rep. of Germany | 188/73.38 |
| 9770 | 1/1977 | Japan | 188/73.38 |

Primary Examiner—George E. A. Halvosa
Attorney, Agent, or Firm—Beveridge, DeGrandi & Kline

[57] ABSTRACT

In a disc brake, the backing plate of the friction pads is guided and supported by the caliper outside of the brake disc, and both end portions of the backing plate is slidably supported by both end portions, arranged in the circumferential direction, of the ceiling surface which is provided on the caliper so as to mount over the brake disc. A piece extended from the central portion of the peripheral portion of backing plate is inserted into a groove formed in the central portion of the ceiling surface.

4 Claims, 13 Drawing Figures

DISC BRAKE

This application is a continuation of Ser. No. 145,923, filed May 2, 1980, now abandoned.

BACKGROUND OF THE INVENTION

1. Field of the Invention

This invention relates to an improvement of the supporting and guiding construction of a caliper and friction pad in a disc brake which is employed mainly for two-wheeled vehicle such as a motor cycle.

2. Description of the Prior Art

In conventional types of disc brakes, it is necessary to remove the caliper in order to replace the friction pads for new ones. However, the removal of the friction pads adversely affects the piping which connects the hydraulic pressure cylinder of the caliper and the master cylinder. Furthermore, the supporting member of the caliper, which supports the friction pads, is protruded towards the brake disc. Accordingly, it is necessary to increase the length of the guide section of the supporting member provided for the inner friction pad provided on the side of the hydraulic pressure cylinder as much as the amount of effective wear of the outer friction pad which is provided on the side of the brake disc which is opposite to the side where the hydraulic pressure cylinder is provided. In addition, the inner friction pad is relatively thick, which increases the weight of the disc brake.

SUMMARY OF THE INVENTION

Accordingly, a first object of this invention is to provide a disc brake in which the friction pads are light in weight and can be readily replaced.

A second object of the invention is to provide a friction pad supporting device for a disc brake of the type that a pair of friction pads are supported on the caliper by means of one guide pin; wherein the play of the friction pads is prevented when the brake is not applied, and corrosion of the sliding section of the frictional pads and the caliper is prevented by this invention, whereby the disc brake can be operated smoothly at all times when the brake is applied.

In the friction pad supporting device according to this invention, a leaf spring which is made of corrosion resisting metal and is also extended in the circumferential direction of the brake disc is provided on the inner surface of the bridge portion of the caliper, which straddles the brake disc, and both end portions of the leaf spring are elastically engaged between the ceiling surface of the bridge portion of the caliper and the both end portions of the backing plate of friction pad, so that the play, mainly in the rotational direction, of the friction pad around the guide pin supporting the friction pad can be prevented. The leaf spring is made of corrosion resisting metal, so that the sliding section of the caliper and the friction pad can be protected from corrosion and wear.

A third object of the invention is to provide a caliper guiding device for a disc brake, in which a guide groove is formed in a fixing member, and a guide spring made of corrosion resisting metal is engaged through an elastic member with a protruding strip which is formed integral with the caliper, so that the guide spring made of a leaf spring can be snugly and elastically engaged with the groove through the elastic member.

The nature, principle and utility of this invention will become more apparent from the following detailed description when read in conjunction with the accompanying drawings.

DETAILED DESCRIPTION OF THE INVENTION

Figure 1:
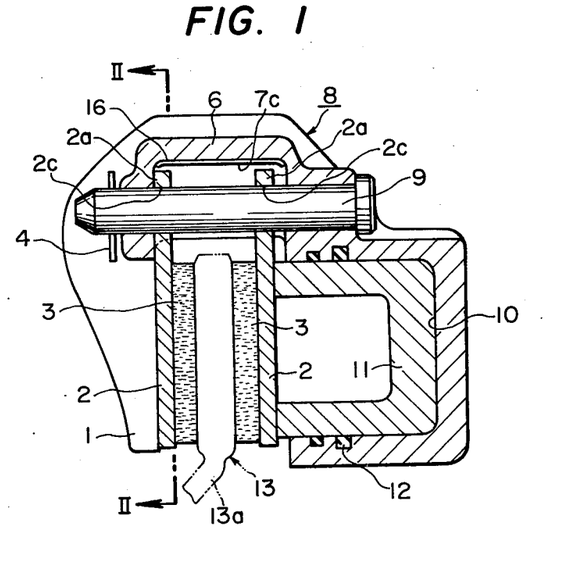
FIG. 1 is a longitudinal sectional view showing a first embodiment of a disc brake according to the invention.
Figure 2:
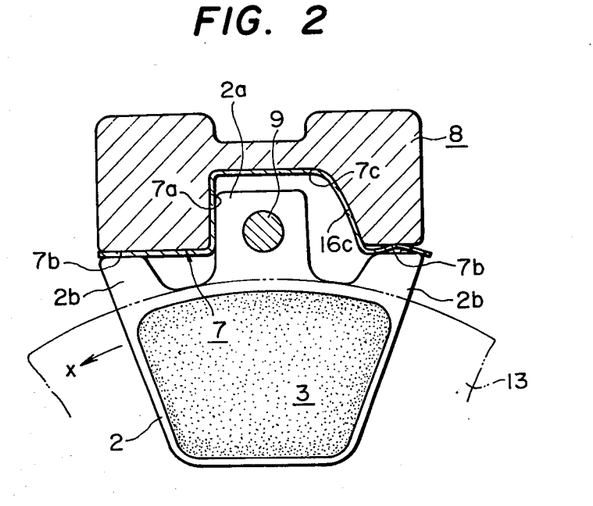
FIG. 2 is a sectional view taken along line II—II in FIG. 1.

A first embodiment of a disc brake according to this invention, as shown in FIGS. 1 and 2, comprises a pair of friction pads 3 disposed on both sides of a brake disc 13, and a caliper 8 which straddles the brake disc 13 and is secured to a vehicle body (not shown) in such a manner as to be slidable perpendicularly to the brake disc 13. Each friction pad 3 is provided on a backing plate 2 which has a protruding piece 2a extending from the central portion of a periphery of the backing plate radially outwardly of the brake disc 13. The protruding piece 2a has a pin hole 2c into which a guide pin 9 is inserted. Both ends of the guide pin 9 are inserted into both side walls of the caliper 8 and are then locked with a locking pins 4. A cylinder 10 is integrally formed in one side wall portion of the caliper 8. A piston 11 is inserted into the cylinder 10 through seal rings 12. The outer end of the piston 11 is abutted against the backing plate 2 of one of the friction pads 3. The other wall portion of the caliper 8 is forked and has a reaction force piece 1 abutting against the rear surface of the backing plate 2 of the other friction pad 3.

In the embodiment, as particularly shown in FIG. 2, the caliper 8 has a ceiling surface 7 straddling the brake disc 13. The ceiling surface 7 has a pair of sliding guide surface 7b spaced apart from each other circumferentially of the brake disc 13. In the central portion of the ceiling surface 7, a cut groove 7c is provided which extends in parallel with the axis of the brake disc 13.

The aforementioned guide pin 9 is arranged in such a manner as to be in the cut groove 7c. The backing plate 2 also has a pair of protruding pieces 2b which extend from the both end portions of the peripheral portion of the backing plate radially outwardly of the brake disc 13. The protruding pieces 2b are abutted against the guide surfaces 7b through a leaf spring 16. The side edge of the protruding portion 2a which are extended from the peripheral central portions of the backing plates 2 and are supported by the guide pin 9 are abutted against the side wall 7a of the cut groove 7 through the leaf spring 16.

The leaf spring 16 is in engagement with the inner surface of the cut groove 7c, and both ends of the leaf spring 14 are inserted between the guide surfaces 7b and the protruding pieces 2b, so as to prevent the play of the frictional pads 3.

When liquid is supplied, under pressure, into the cylinder 10, then the piston 11 is moved left as viewed in FIG. 1, whereby the right frictional pad 3 is pressed against the right surface of the brake disc 13. On the other hand, the liquid pressure reaction force causes the caliper 8 to move right along a guide member not shown, and the reaction force piece 1 causes the left friction pad 3 to press against the left surface of the brake disc 13 to thereby generate a brake force. In the braking operation, the protruding piece 2a of the backing plate 2 are guided by the guide pin 9, while the protruding pieces 2b are guided by the leaf spring 16 on the guide surfaces 7b. Thus, the play of the friction pads 3 is prevented by the leaf spring 16. Owing to the frictional engagement of the friction pads 3 and the brake disc 13, when the vehicle is moved forwardly, the friction pads 3 receive the rotational force which rotates them clockwise in FIG. 2 around the guide pin 9 with respect to the rotation in the direction of the arrow X of the brake disc 13, however, this rotational force is prevented by the abutment of the protruding pieces 2b and the side wall portions 7b.

When the liquid pressure in the cylinder 10 is released, then the brake force is also released.

In the embodiment described above, since the protruding piece 2a is supported by the guide pin 9, even if the pair of friction pads 3 are worn to the limit of use, they will never fall off the guide. Accordingly, in the disc brake of the invention, unlike the conventional one, it is unnecessary to especially increase the thickness of the inner frictional pad which corresponds to the right frictional pad in FIG. 1, thus resulting in a reduction of the weight of the disc brake.

After the guide pin 9 is removed from the disc brake, the right frictional pad 3 can be readily removed downwardly. Although removing the left frictional pad 3 is obstructed by a flange 13a of the brake disc 13, the left frictional pad 3 can be removed by pulling it circumferentially of the brake disc 13. Thus, it is unnecessary to remove the caliper 8 from the vehicle body in order to replace the frictional pads.

As was described before, the protruding piece 2a of the backing plates 2 is abutted against the side wall 7a of the groove 7c which is provided in the ceiling surface 7 of the caliper 8 in such a manner as to extend in the axial direction of the brake disc 13. Therefore, the force which is imparted in a circumferential direction to the frictional pads 3 during braking is supported by the side wall 7a of the groove 7c. Accordingly, the burden in strength with respect to the bending stress applied to the guide pin 9 can be reduced.

Figure 3:
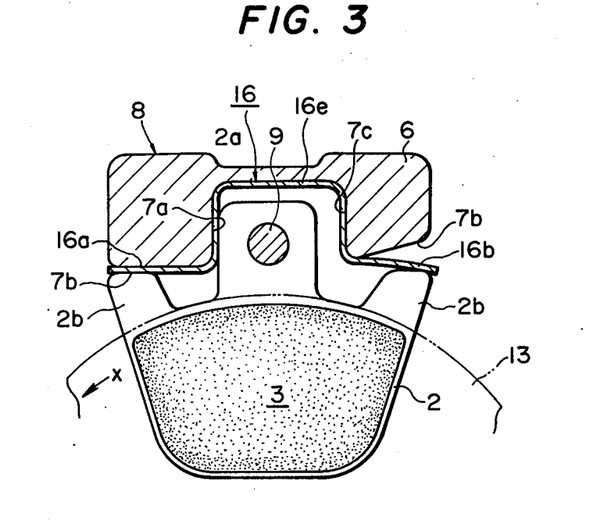
FIG. 3 is a cross-sectional view of a second embodiment of the disc brake according to the invention.

A second embodiment of the disc brake according to the invention is as shown in FIG. 3, in which those components which have been previously described with reference to FIGS. 1 and 2 are therefore similarly numbered.

In the second embodiment, the backing plate 2 of each friction pad 3 has a protruding piece 2a and a pair of protruding pieces 2b which are extended respectively from the central portion and both end portions of a peripheral portion of the backing plate 2 radially outwardly of a brake disc 13. A groove 7c is formed in the bridge 6 of the caliper 8. The protruding piece 2a is extended into the groove 7c and are supported by a guide pin 9. A leaf spring 16 is made of a corrosion resisting metal material. The leaf spring 16 is mounted over the pair of backing plates 2. The central portion of the leaf spring 16 is bent in the form of an inverted "U" so that it is engaged with the groove 7c. Both end portions 16a and 16b of the leaf spring 16 are bent substantially at right angle and in the opposite direction, so that the end portions 16a and 16b are engaged with the protruding pieces 2b, respectively. One end portion 16b of the leaf spring 16 is adapted to depress the right protruding piece 2b. Therefore, the rotational force in the clockwise direction around the guide pin 9 is applied to the backing plates 2. This rotational force holds the end portion 16a of the leaf spring 16 between the protruding pieces 2b and the guide surfaces 7b which form parts of the ceiling surface 7 of the caliper 8. The central portion 16e of the leaf spring 16 is adapted to slidably guide the side edge of the protruding piece 2a along the vertical wall of the groove 7c.

Thus, the second embodiment of the disc brake according to the invention has specific features that, as was described before, the central protruding piece 2a extended from the backing plates 2 of the friction pads 3 radially outwardly of the backing plates are slidably supported by the guide pin 9 which is supported by the caliper 8 and is extended over the periphery of the brake disc, the two end protruding pieces 2b extended from the backing plates are confronted with the ceiling surface 7 of the bridge 6 of the caliper 8, the leaf spring made of corrosion resisting metal material is disposed between the ceiling surface 7 and the two end protruding pieces 2b of the backing plates 2 and one end portion 16b of the leaf spring 16 is abutted against the protruding pieces 2b of the backing plates 2 to give a force to the backing plates 2 so as to rotate the backing plates 2 around the guide pin 9, whereby the end protruding pieces 2b of the backing plates 2 are caused to abut against the guide surfaces 7b of the ceiling surface 7 through the other end portion 16a of the leaf spring 16. Thus, when the brake is released, the play of the friction pads due to the vibration of the vehicle body can be completely prevented. As the leaf spring 16 is made of corrosion resisting metal material, the sliding portions of the friction pads which are caused to slide along the caliper when braking is effected can be prevented from wear and corrosion, which makes it possible to maintain the sliding portions smooth for a long period of time. This is effective especially in the case where the caliper is of aluminum cast which is liable to wear when slid.

Figure 4:
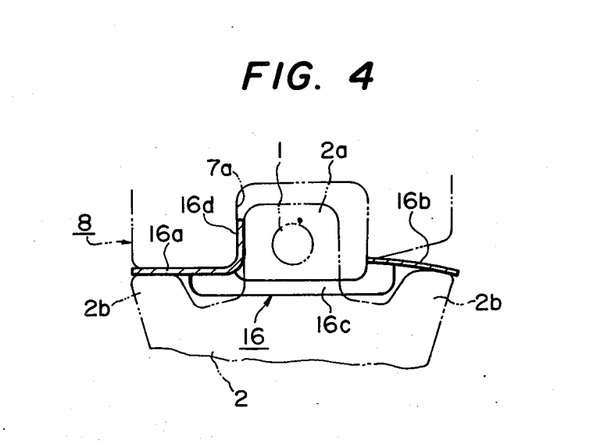
FIG. 4 is an explanatory diagram showing one modification of the disc brake shown in FIG. 3.

One modification of the second embodiment described above is shown in FIG. 4. In this modification, in both side edge portions of a leaf spring 16, edge portions 16c are bent so as to abut against surfaces (where the pads 3 are not provided) of one pair of friction pads. An opening is formed in the central portion of the leaf spring so that the protruding piece 2a is extended therethrough. In forming the opening, a protruding piece 16d is cut and bent upright so that it is engaged between the side wall 7a of the groove 7 and the protruding piece 2a. The end portion 16b of the leaf spring is adapted to depress the right protruding piece 2b to thereby rotate the backing plates in one direction (which is opposite to the rotational direction X in FIG. 3 of the disc 13 when the vehicle moves forwardly) around the guide pin 9. The protruding pieces 16a, 16b and 16d serve as sliding parts for the protruding pieces 2a and 2b of the backing plate 2 of the friction pad 3 with respect to the caliper 8.

Figure 5:
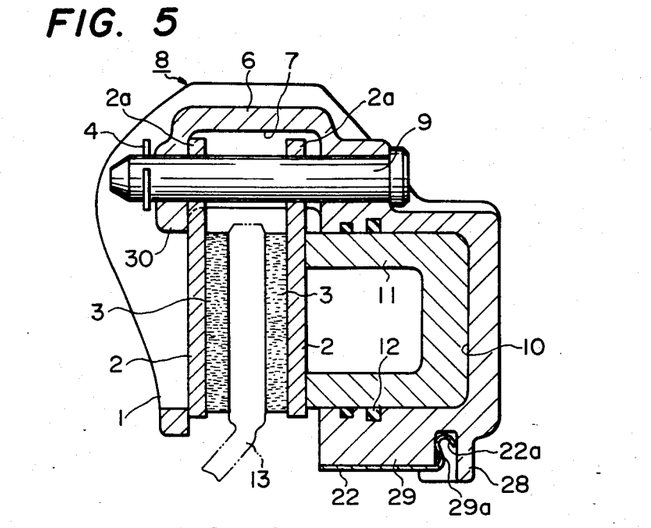
FIG. 5 is a longitudinal sectional view of a third embodiment of the disc brake according to the invention.
Figure 6:
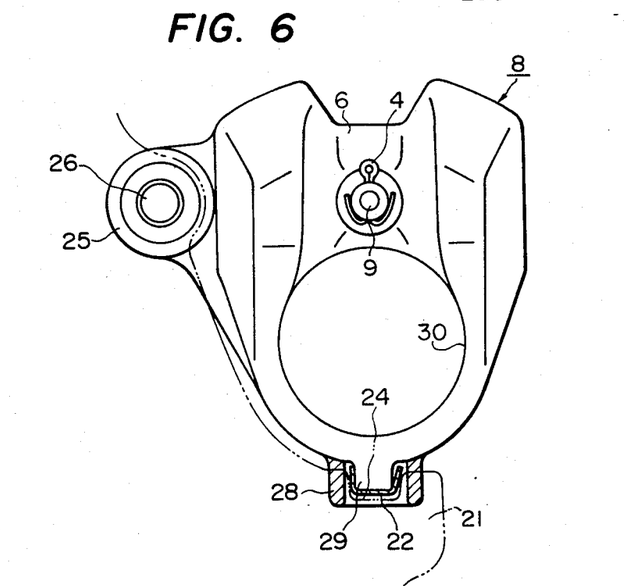
FIG. 6 is a right side view of the disc brake shown in FIG. 5.
Figure 7:
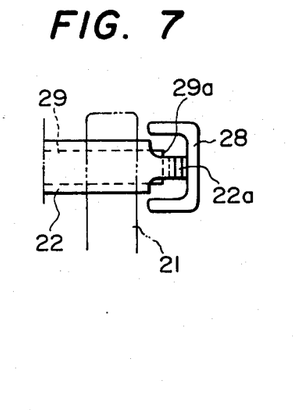
FIG. 7 is an explanatory diagram showing a part of a caliper guiding construction in the disc brake shown in FIG. 5.

A third embodiment of the disc brake according to the invention is shown in FIGS. 5, 6 and 7. In the third embodiment, an arm 25 is extended from one end of the caliper 8, and a pin hole is formed in the arm 25. A supporting pin 26 is inserted into the pin hole. The supporting pin 26 is supported by a vehicle stationary member, which is a fork member 21 adapted to support the front wheel of a motor cycle. Thus, the caliper 8 is guided slidably in parallel with the rotational axis of a brake disc 13.

A protruding strip 29 is extended from the bottom portion of the wall of a cylinder 10. The protruding strip 29 is slidably engaged with a groove 21 formed in the fork member 21 through a guide spring 22 having a U-shaped section. The provision of the guide spring 22 prevents the play of the caliper 8.

The protruding strip 29 is extended in the axial direction of the cylinder 10. A surrounding walls 28 is formed on the wall of the cylinder 10 in such a manner as to surround one end portion 29a of the protruding strip 29, which is away from the brake disc 13. The guide spring 22 has a bent piece 22a which is inserted into a groove between the surrounding wall 28 and the end portion 29a of the protruding strip 29. The protruding strip 29 and the groove 24 are on the line connecting the central axis of the cylinder 10 and the rotational axis not shown of the disc 13 and between these axes.

When liquid is supplied, under pressure, into the cylinder 10 of the disc brake thus constructed, the piston 11 is moved left as viewed in FIG. 5 to cause the right friction pad 3 to abut against the right surface of the brake disc 13, while the caliper 8 is moved right along the supporting pin 26 and the guide groove 24, as a result of which the reaction force piece 1 of the caliper presses the left frictional pad 3 against the left surface of the brake disc 13, thus providing a brake force.

When the caliper 8 is slid, the vibration of the caliper 8 is prevented by the guide spring 22 which is inserted into the gaps between the protruding strip 29 and the groove 24. The bent piece 22a is surrounded by the surrounding wall 28, that is, it is not exposed. Therefore, troubles that the operator is injured thereby and his clothes are torn thereby for instance, can be prevented. Furthermore, the guide spring 22 will never be damaged by rocks thrown by the running vehicle. Since the bent piece 22a of the guide spring 22 is elastically engaged between the surrounding wall 28 and the end portion 29a of the protruding strip 29, the guide spring 22 will not come off.

As is clear from the above description, in the disc brake according to the third embodiment, one part of the caliper is supported to the vehicle body through the supporting pin, and the other part of the caliper is supported by the engagement of the protruding strip and the groove. The guide spring is inserted in the sliding section between the protruding strip and the groove. Therefore, the vibration of the caliper can be effectively prevented. Also, the end portion of the guide spring is bent and engaged with the end portion of the protruding strip, and furthermore the surrounding wall is formed integrally with the caliper in such a manner as to surround the engaging portion of the guide spring. Therefore, the guide spring is not exposed. Thus, this provides high security against anything which may be brought into contact therewith. In addition, this prevents foreign matters from being thrown towards the sliding section from both sides of the vehicle, thus protecting the sliding section.

Figure 8:
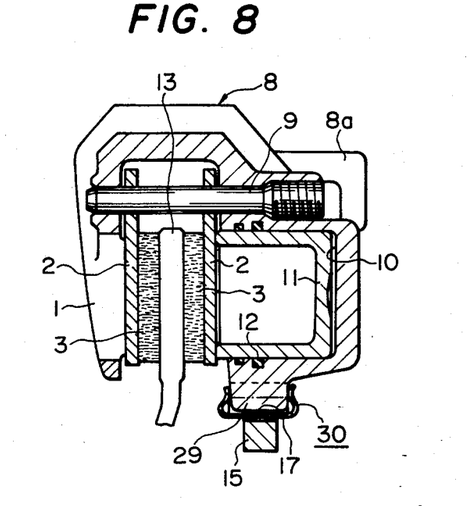
FIG. 8 is a longitudinal sectional view showing a fourth embodiment of the disc brake according to the invention.
Figure 9:
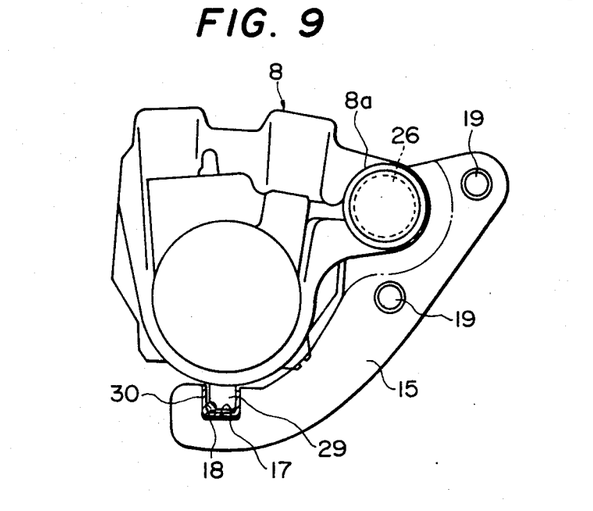
FIG. 9 is a right side view of the disc brake shown in FIG. 8.
Figure 10:
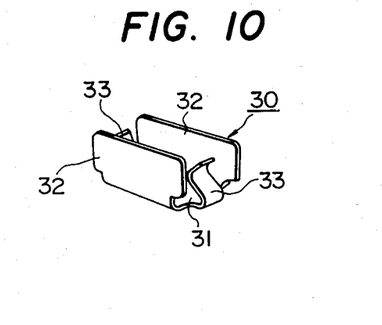
FIG. 10 is a perspective view showing a guide spring employed in the disc brake in FIG. 8.

A fourth embodiment of the disc brake according to the invention is shown in FIGS. 8, 9 and 10. In the fourth embodiment, a fixing member 15 is an arcuate, thick plate as shown in FIG. 9, and has two holes 19 into which bolts are inserted to fixedly secure the fixing member to a vehicle body which may be a fork member adapted to support the wheel in the case of a motor cycle. The fixing member 15 fixedly supports a supporting pin 26 which is extended perpendicularly to a brake disc 13. The pin 26 is inserted into a cylindrical portion 8a integral with a caliper 8 so as to support the caliper 8 slidably in a direction perpendicular to the brake disc 13. A guide groove 17 is formed in the lower portion of the fixing member 15. A protruding strip 29 is formed on the lower portion of the wall of a cylinder 10 in the caliper 8. The protruding strip 29 is guided and supported by the guide groove 17.

In order to prevent the play of the caliper around the supporting pin 26 and to prevent the corrosion of a sliding section provided by the guide groove 17 and the protruding strip 29, a guide spring 30 is inserted between the protruding strip 29 and the guide groove 17 in such a manner that the protruding strip 29 is covered by the guide spring 30 and slides along the groove 17 through the guide spring 30. The guide spring 30, as shown in FIG. 10, has a pair of wall plates 32 which are formed by bending at right angle both side edge portions of a plate 31, and locking pieces 33 which are formed by bending in the form of the character "S" both end edge portions of the plate 31. The wall plates 32 are engaged with the side walls of the protruding strip 29, respectively. The locking pieces 33 are elastically engaged with both end wall surfaces of the protruding strip 29. A cut is formed in the corner portion of the protruding strip 29. A cylindrical, elastic member 18 made of rubber or the like is inserted into the cut in such a manner as to extend in the axial direction of the brake disc 13, so that the the guide spring 30 is elastically engaged with the protruding strip 29.

In the above-described embodiment, the guide spring 30 is elastically engaged with the protruding strip 29 and is brought into close contact with the guide groove 17. Therefore, the guide spring 30 and the protruding strip 29 move as one unit. Accordingly, the play of the caliper 8 around the supporting pin 26 can be prevented. Furthermore, the guide spring 30 is made of a hard, corrosion resisting metal plate. Therefore, even if muddy water enters between the guide spring 30 and the guide groove 17, the guide spring 30 will never be corroded, and accordingly the caliper 8 can be smoothly operated at all times.

As is clear from the above description, the specific feature of the above-described embodiment of the caliper guide construction resides in that the guide spring 30 made of a leaf spring having a U-shaped section is engaged through the elastic member 18 with the protruding strip 29 of the caliper 8 which is slidably supported by the guide groove 17 formed in the fixing member 15. Accordingly, there is no gap between the protruding strip 29 and the guide groove 17. Hence, although a brake torque is imparted to the caliper during braking, the vibration, in the direction of rotating around the guide pin 26, of the caliper 8 can be prevented. If, for convenience in assembling work, a suitable gap is provided between the protruding strip 29 and the guide groove 17 in advance and the guide spring 30 is engaged with the protruding strip 29 through the elastic member 18, then the caliper 8 can be readily combined with the fixing member 15, with the gap eliminated.

The guide spring 30 is made of a hard material, preferably of a spring steel plate, and it is subjected to corrosion resisting process. Therefore, the guide spring 30 is sufficiently durable against the brake torque reaction force which is transmitted from the caliper 8 through the guide spring 30 to the fixing member 15 in braking while the vehicle is moving forwardly. Accordingly the caliper 8 is never deformed. In braking while the vehicle is moving backwardly, a brake force is imparted to the caliper 8. By this brake force, the caliper 8 is turned clockwise around the pin 26 in FIG. 9 to compress the elastic member 18. When a greater force is applied to the caliper 8, the caliper 8 is abutted directly against the guide spring 30, as a result of which the elastic member 8 is brought into contact with one side wall of the guide groove 17. Thus, the vibration of the caliper 8 is absorbed by the elastic member 18.

Figure 11:
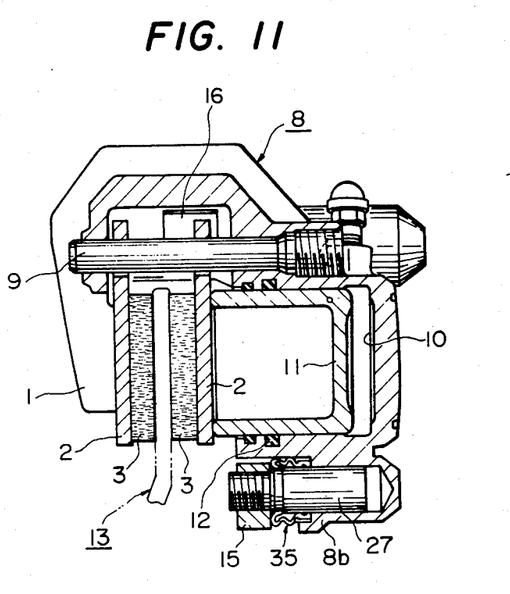
FIG. 11 is a longitudinal sectional view showing a fifth embodiment of the disc brake according to the invention.
Figure 12:
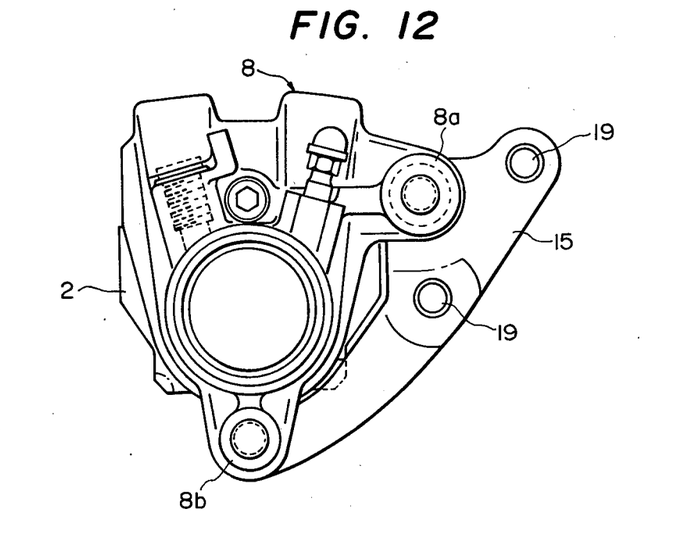
FIG. 12 is a right side view of the disc brake in FIG. 11.
Figure 13:
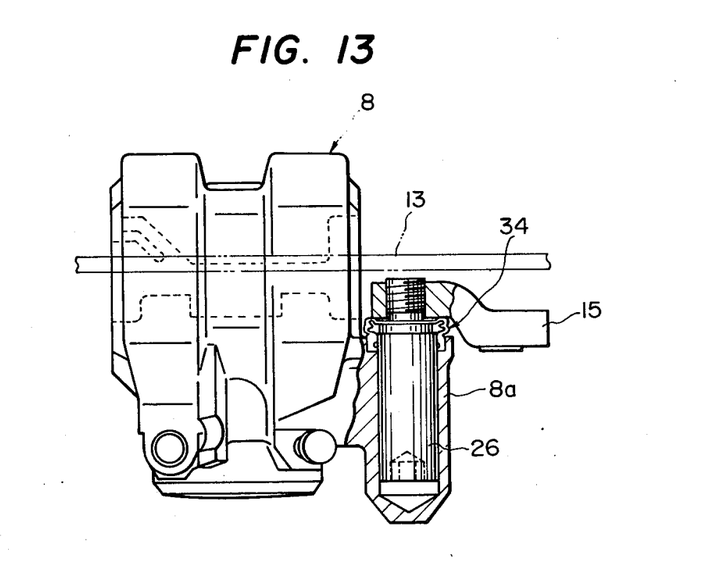
FIG. 13 is a plan view of the disc brake shown in FIG. 11.

A fifth embodiment of the disc brake according to the invention is shown in FIGS. 11, 12 and 13, in which those components which have been previously described with reference to FIGS. 5 through 10 are therefore similarly numbered.

A supporting pin 26 adapted to mainly support a caliper 8 is coupled to a fixing member 15 with a screw outside of a brake disc 13 as shown in FIG. 13. The supporting pin 26 is provided only on one side of the brake disc 13. The supporting pin 26 is slidably inserted into a cylindrical portion 8a of the caliper 8. An auxiliary pin 27 is coupled to the fixing member 15 with a screw in such a manner that it is on a line connecting the central axis of a cylinder 10 to the rotational axis, not shown, of the brake disc 13 and between these axes. The auxiliary pin 27 and the supporting pin 26 are provided on the same side of the brake disc 13. As the auxiliary pin 27 is slidably inserted into a cylindrical portion 8b formed on the caliper 8, the rotation of the caliper 8 around the supporting pin 26 can be prevented. The sliding sections of the supporting pin 26 and the auxiliary pin 27 are securely protected from muddy water or the like by boots 34 and 35, respectively. The supporting pin 26 and the auxiliary pin 27 may be fixedly secured to the vehicle body, for instance, the fork member in the case of motor cycles.

What is claimed is:

1. A disc brake in which friction pads are abutted against a brake disc by a caliper straddling said brake disc whereiin a ceiling surface having end portions is provided facing to the outer periphery of said brake disc, on a portion of said caliper which straddles said brake disc, a pair of peripheral portions of a backing plate of said friction pads are spaced in a circumferential direction of said brake disc and are slidably guided by said end portions of said ceiling surface, a groove is formed in said ceiling surface of said caliper so as to extend in parallel with the axis of said brake disc, a protruding portion is extended from said backing plate between said pair of peripheral portions of said backing plate radially outwardly of said brake disc in such a manner that said protruding portion is located within said groove, a guide pin secured to said caliper is inserted into said protruding portion of said backing plate between said pair of peripheral portions, a leaf spring is disposed between said ceiling surface and said pair of peripheral portions of said backing plate constructed and arranged such that a portion of said spring between one peripheral portion and said ceiling surface turns said friction pads around said guide pin, causing the other peripheral portion to be urged against another portion of said spring interposed against said ceiling, said leaf spring is provided integrally with a U-shaped portion disposed within said groove of said caliper and said portions disposed between said pair of peripheral portions of said backing plate and said ceiling surface, and one side edge of said protruding portion is abutted against a section of said U-shaped portion of said spring interposed against a side wall of said groove, whereby force imparted to the friction pads during braking is supported by said side wall of said groove and bending stresses on said guide pin are reduced.

2. A disc brake as claimed in claim 1, wherein said guide pin is inserted into said protruding portions without any gap.

3. A disc brake as claimed in claim 1, wherein said leaf spring is made of a corrosion resisting metal material.

4. A disc brake as claimed in claim 1, wherein said leaf spring imparts a rotational force to said friction pads, which turns said friction pads in a direction opposite to a direction of rotation of said brake disc while a vehicle is moving forwardly.

* * * * *